US012595776B2

(12) United States Patent
Mueller

(10) Patent No.: US 12,595,776 B2
(45) Date of Patent: Apr. 7, 2026

(54) GAS INJECTOR WITH DAMPING DEVICE, IN PARTICULAR FOR SHORT STROKES

(71) Applicant: Robert Bosch GmbH, Stuttgart (DE)

(72) Inventor: Martin Mueller, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 297 days.

(21) Appl. No.: 18/566,220

(22) PCT Filed: Apr. 13, 2022

(86) PCT No.: PCT/EP2022/059901
§ 371 (c)(1),
(2) Date: Jan. 30, 2024

(87) PCT Pub. No.: WO2022/258246
PCT Pub. Date: Dec. 15, 2022

(65) Prior Publication Data

US 2024/0254948 A1 Aug. 1, 2024

(30) Foreign Application Priority Data

Jun. 7, 2021 (DE) .................... 10 2021 205 694.6

(51) Int. Cl.
*F02M 21/02* (2006.01)
*F02M 51/06* (2006.01)

(52) U.S. Cl.
CPC .... *F02M 21/0254* (2013.01); *F02M 21/0269* (2013.01); *F02M 51/0625* (2013.01); *F02M 21/0206* (2013.01)

(58) Field of Classification Search
CPC .......... F02M 21/0254; F02M 21/0269; F02M 51/0625; F02M 21/0206
USPC ........................................................ 239/91
See application file for complete search history.

(56) References Cited

FOREIGN PATENT DOCUMENTS

| | | | |
|---|---|---|---|
| DE | 102008041544 | A1 | 3/2010 |
| JP | H09310656 | A | 12/1997 |
| WO | 2017167558 | A1 | 10/2017 |

OTHER PUBLICATIONS

International Search Report Issued in PCT/EP2022/059901, Issued Sep. 13, 2023.

*Primary Examiner* — Chee-Chong Lee
(74) *Attorney, Agent, or Firm* — NORTON ROSE FULBRIGHT US LLP

(57) ABSTRACT

A gas injector for injecting a gaseous fuel. The gas injector includes a magnetic actuator having an armature, an inner pole, and a coil, a closing element which opens and closes off a gas path at a sealing seat, the armature being operatively connected to the closing element, a sealed lubricant chamber filled with a lubricant and in which the armature is arranged, wherein the lubricant ensures lubrication of the armature, and a brake device which is arranged in the lubricant chamber and is designed to brake the closing element when the gas injector is reset from the open state to the closed state. The brake device has a brake pin, a damping chamber filled with lubricant and fluidically connected to the lubricant chamber via a first fluid path, a resilient brake element, an armature pin which is operatively connected to the armature and includes a guide disk.

10 Claims, 4 Drawing Sheets

GAS INJECTOR WITH DAMPING DEVICE, IN PARTICULAR FOR SHORT STROKES

FIELD

The present invention relates to a gas injector for injecting a gaseous fuel, in particular hydrogen or natural gas or the like, with reduced wear and improved damping behavior, in particular for internal combustion engines. The gas injector is designed in particular for direct injection into a combustion chamber of an internal combustion engine and can in particular damp short opening strokes very well.

BACKGROUND INFORMATION

Gas injectors are available in the related art in different designs. One problem with gas injectors is in principle that, due to the gaseous medium to be injected, lubrication by the medium is not possible, as is the case, for example, with fuel injectors which inject gasoline or diesel. During operation, this results in excessive wear compared to fuel injectors for liquid fuels. In this case, it would be desirable to have a gas injector having improved wear behavior.

SUMMARY

A gas injector according to the present invention for injecting a gaseous fuel may have an advantage that the wear of the gas injector can be significantly reduced. This can be ensured in the case of both long and short opening strokes of the gas injector. The service life of the gas injector is thereby extended and substantially matches the service life of a fuel injector for liquid fuels. In particular, when the gas injector is closed, a closing element can provide a significantly more damped closing process, so that wear on the sealing seat and other components of the closing element is reduced or prevented. In particular in the case of short opening times of the gas injector, for example when an internal combustion engine is idling, or in the case of multiple short injection processes, sufficient damping of a closing element returning to the closed starting position can be ensured. According to the an example embodiment of the present invention, this is achieved in that the gas injector has a lubricant located in a sealed lubricant chamber, in which moving parts of the gas injector are arranged. The gas injector comprises a magnetic actuator having an armature, an inner pole and a coil. In this case, the armature, which is operatively connected to a closing element which opens and closes off a gas path at a sealing seat, is provided to allow a movement for opening and/or closing the gas injector. The armature located in the lubricant chamber, which is attracted to the inner pole of the magnetic actuator by electromagnetic forces when the coil is energized, is thus located in the interior of the lubricant chamber and is constantly supplied with lubricant and lubricated. As a result, wear on the armature is significantly reduced compared to the gas injectors from the related art. Furthermore, using the sealed lubricant chamber filled with lubricant can significantly extend the service life of the gas injector. The lubricant chamber is preferably completely filled with lubricant.

Furthermore, according to an example embodiment of the present invention, the gas injector comprises a brake device which is arranged in the lubricant chamber and is designed to brake and damp the closing element when the gas injector is reset from the open state to the closed state. The brake device comprises a brake pin, a damping chamber which is fluidically connected to the lubricant chamber via a first fluid path, and a resilient brake element, in particular a spring. Furthermore, the brake device comprises an armature pin on which the armature is arranged and which is operatively connected to the closing element, and a guide disk in which the armature pin is guided. A brake pin valve of the brake device is provided for the purpose of opening and/or closing off a second fluid path for additional filling of the damping chamber of the brake device with lubricant. The damping chamber is filled via the second fluid path in the open state of the gas injector. The brake pin valve is arranged on a brake valve seat between the armature pin and the brake pin in order to open and/or close off the second fluid path.

During the resetting process, the brake pin and the resilient brake element are operatively connected to the closing element and/or the armature, wherein the brake pin is further designed to displace lubricant out of the damping chamber during the resetting process in order to damp the resetting of the brake pin and thus the resetting of the closing element. Because a part of the braking process is also provided by hydraulic adhesion between the brake pin and a stop component against which the brake pin rests in the open state of the gas injector, the provision of the damping chamber allows vapor bubble formation in the liquid lubricant when the hydraulic adhesion is overcome to be prevented, so that in particular wear due to cavitation can be prevented.

This is additionally supported by the acceleration, provided by the brake device, of the additional masses. Furthermore, further braking is realized by means of the displacement of the lubricant by the armature and the brake pin. Providing two fluid paths for filling the damping chamber with lubricant can ensure reliable and adequate filling of the damping chamber with lubricant even when the gas injector is opened only briefly. As a result, during a subsequent closing process of the gas injector, it can always be ensured that there is sufficient lubricant in the damping chamber to damp the resetting process of the closing element. A resetting speed of the closing element can also be further reduced by friction of guide elements or the like with the brake pin. All of this reduces the impact force of the armature on the stop, so that the service life of the armature can also be further extended.

Preferred developments of the present invention are disclosed herein.

The brake pin valve preferably comprises a through bore in the brake pin, which connects a first end face of the brake pin to the damping chamber and is part of the second fluid path. The armature pin has a second end face facing the damping pin, wherein, in the closed state of the gas injector, the first end face of the brake pin rests against the second end face of the armature pin in such a way that the second fluid path is closed. Therefore, in the closed state, no lubricant can flow through the through bore in the brake pin into the damping chamber. In this case, the second fluid path is open only in the open state of the gas injector, so that sufficient lubricant can reach the damping chamber through the open brake pin valve and the through bore in the brake pin.

Further preferably, according to an example embodiment of the present invention, the brake device comprises a throttle which is arranged in the first fluid path between the damping chamber and the lubricant chamber. The throttle is preferably a stepped bore and ensures that there is a fluid connection between the damping chamber and the lubricant chamber in each operating state of the gas injector, i.e., whether open or closed. By selecting the geometric dimensions of the bore, for example the diameter and/or length of the bore, the damping behavior of the brake device can be set.

The throttle is preferably arranged in a guide body and is designed as a through bore in the guide body, wherein the guide body is configured to guide the brake pin. Alternatively, the first fluid path is formed between the brake pin and the guide body and is preferably formed as a groove in the jacket of the brake pin and/or as a groove in the guide cylinder in the guide body for the brake pin.

In order to ensure the fastest possible filling of the damping chamber with lubricant, one or more channels are preferably formed in a side of the guide disk directed toward the brake pin. Alternatively or additionally, one or more channels are formed in the first end face of the brake pin. The additional channels ensure that sufficient lubricant can flow from the lubricant chamber to the damping chamber via the second fluid path in the open state. Further flow improvement is achieved if the channels are preferably fluidically connected to one another by a peripheral recess. The recess for connecting the channels is preferably formed in the guide disk.

The brake valve seat between the brake pin and the armature pin is preferably designed as a flat sealing seat. Alternatively, the brake valve seat is a cone/ball seat or a cone/cone seat.

According to a further preferred embodiment of the present invention, the resilient brake element of the brake device is arranged in the damping chamber. As a result, a particularly compact design can be realized. The resilient brake element is preferably a compression spring, in particular a cylindrical spring.

According to a further preferred embodiment of the present invention, the gas injector comprises a guide body arranged in the lubricant chamber and having a guide region for guiding the brake pin. The guide body preferably has a recess, in particular at an end of the guide body directed toward the sealing seat, in which the brake pin is guided. In order to ensure that the lubricant chamber is sealed, a flexible sealing element, for example a bellows, is preferably provided, which seals the lubricant chamber in a partial region.

The flexible sealing element of the lubricant chamber preferably comprises a first and a second flexible sealing element. The two sealing elements are particularly preferably bellows. The lubricant chamber is thus sealed by two flexible sealing elements, which can prevent an unfavorable overpressure or negative pressure from occurring when the lubricant is displaced in the lubricant chamber, which can exert an unwanted force on the closing element of the gas injector via components of the lubricant reservoir, for example. By providing two flexible sealing elements, even if an unfavorable force is exerted on one of the sealing elements which could cause a pressure increase in the sealed lubricant chamber, the second flexible sealing element can provide compensation. An undesired pressure change in the interior of the sealed lubricant chamber can thus be successfully prevented.

An accumulator spring further preferably exerts a predetermined force on the lubricant in the sealed lubricant chamber from the outside. Preferably, an overpressure between 0.5 to $10\times10^5$ Pa is exerted in this case, particularly preferably 1 to $5\times10^5$ Pa. The lubricant in the lubricant chamber can thus be placed under a predetermined preloading, as a result of which unwanted deformations that could affect a stroke of the closing element can be reliably prevented.

According to an example embodiment of the present invention, the second bellows is further preferably connected to the accumulator spring via a spring plate. A simple and cost-effective design can thereby be realized. Furthermore, a certain preloading can thereby be exerted directly on the second bellows by means of the accumulator spring, as a result of which a rigidity of the second bellows is slightly increased relative to the first bellows.

An oil, in particular mineral oil, is preferably used as the lubricant. Alternatively, a liquid fuel, in particular diesel or gasoline, is used. Further alternatively, a grease or a PAO oil (polyalphaolefins) or an ester oil or a polyglycol oil is used as the lubricant.

According to an example embodiment of the present invention, the gas injector is preferably an outward opening injector. Further preferably, the gas injector is balanced as regards pressure force. As a result, the force for opening the gas injector by the magnetic actuator is independent of the gas pressure. The time it takes to open and close the injector after the start or end of energization is thus also independent of the gas pressure. This in turn allows operation at different gas pressures. If a small injection quantity is desired, the gas pressure can be reduced, and if a large injection quantity is desired, the gas pressure can be increased. The injector is balanced as regards pressure force when the mean diameter of the bellows is equal to the diameter of the seat contact line between the closing element and the valve body. However, the central bellows diameter can also be smaller or larger than the seat diameter. In the first case, at a higher gas pressure, the total closing force on the valve needle is reduced and the injector opens faster when energized and closes more slowly after the energization. This results in an increased gas injection quantity. In the second case, the closing force on the valve needle increases at a higher gas pressure. This in turn can compensate for an increase in the quantity leaked at the seat due to the higher gas pressure.

Resetting preferably takes place by means of a resetting spring. In the case of an injector that is balanced as regards pressure force, there is in particular no pressure force on the valve needle due to the gaseous fuel in the closed state of the gas injector, so that the load on the closing element can be significantly reduced.

BRIEF DESCRIPTION OF THE DRAWINGS

An exemplary embodiment of the present invention is described in detail below with reference to the figures.

DETAILED DESCRIPTION OF EXAMPLE EMBODIMENTS

A gas injector 1 according to a first preferred exemplary embodiment of the present invention is described in detail below with reference to FIGS. 1 to 3.

Figure 1:
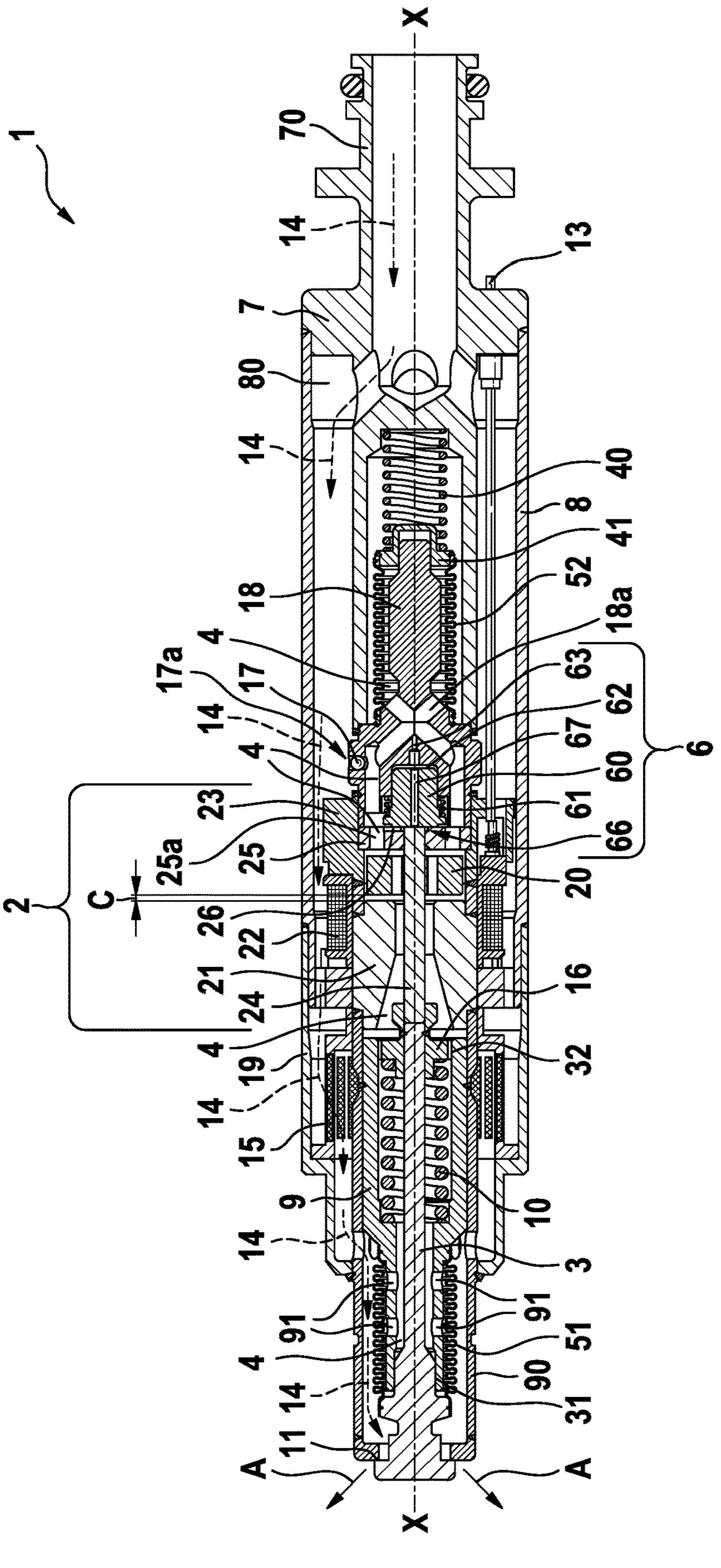
FIG. 1 is a schematic sectional view of a gas injector according to a first preferred exemplary embodiment of the present invention.

As can be seen from FIG. 1, the gas injector 1 for introducing a gaseous fuel comprises a magnetic actuator 2 which moves a closing element 3, in this exemplary embodiment an outwardly opening valve needle, from a closed state to an open state. FIG. 1 shows the closed state of the gas injector.

The magnetic actuator 2 comprises an armature 20 which bears against the closing element 3 by means of an armature pin 24. Furthermore, the magnetic actuator 2 comprises an inner pole 21, a coil 22 and a magnetic housing 23 which ensures a magnetic return of the magnetic actuator.

Furthermore, the gas injector 1 comprises a main body 7 having a connection tube 70 through which the gaseous fuel is supplied. A valve housing 8 in which the magnetic actuator 2 is arranged is fixed to the main body 7. The valve housing 8 is adjoined by a housing sleeve 19 and a valve tube 90, at the free end of which a sealing seat 11 is provided at which the closing element 3 opens and closes off a passage for the gaseous fuel.

FIG. 1 schematically shows an electrical connection 13 which is guided through the main body 7 up to the magnetic actuator 2.

Reference sign 10 denotes a resetting element for the closing element 3 in order to reset it back to the closed state shown in FIG. 1 after an opening process.

In FIG. 1, a gas flow is also shown as a gas path 14 through the gas injector 1. The gas flow begins at the connection tube 70 and is then diverted into an annular chamber 80 between the valve housing 8 and the main body 7. In this case, the gas flow 14 continues past an outer region of the magnetic actuator 2 through a filter 15 up to the sealing seat 11. In this case, openings are provided accordingly in the corresponding components, not all of which are shown in FIG. 1.

When the gas injector 1 is opened, the gaseous fuel then flows past the outer periphery of the magnetic actuator 2 and past the open sealing seat 11 into a combustion chamber of an internal combustion engine, which is indicated by the arrows A in FIG. 1.

The closing element 3 thus opens the gas path 14 at the sealing seat 11 and closes it off. A first guide region 31 and a second guide region 32 are provided between the closing element 3 and a valve body 9 for guidance, as can be seen in the detail of FIG. 1. The first guide region 31 is formed close to the sealing seat 11 directly between the closing element 3 and the valve body 9. In this case, the second guide region 32 is formed between a spring plate 16 and the valve body 9. The spring plate 16 is rigidly connected to the closing element 3, wherein the resetting element 10 is supported between the valve body 9 and the spring plate 16.

Furthermore, the gas injector 1 comprises a sealed lubricant chamber 4. The sealed lubricant chamber 4 is completely or partially filled with a liquid lubricant, e.g. oil.

As can be seen from FIG. 1, the lubricant chamber 4 is defined by a first flexible sealing element 51, the inner pole 21, the magnetic housing 23, a guide body 18, and a second flexible sealing element 52. The first and second flexible sealing elements 51, 52 are in each case in the form of a bellows. The first and second flexible sealing elements 51, 52 are of identical design.

It should be noted that the flexible sealing elements 51, 52 can also be, for example, a diaphragm or a tube or the like instead of a bellows.

As can also be seen from FIG. 1, the second flexible sealing element 52 is fixed to an accumulator spring plate 41, for example by means of a welded connection. Furthermore, the gas injector 1 comprises an accumulator compression spring 40 which is supported on the main body 7 and preloads the second flexible sealing element 52 via the accumulator spring plate 41. Connecting bores 18*a* are provided in the guide body 18, so that the lubricant located in the lubricant chamber 4 is also located in the region within the second flexible sealing element 52.

The first flexible sealing element 51 is fixed directly to the closing element 3 and is connected to the valve body 9 at the other end. In this case, transverse bores 91 are provided in the valve body 9, so that a fluid connection exists between the interior of the first flexible sealing element 51 and the interior of the valve body 9.

The lubricant chamber 4 thus has two flexible sealing elements 51, 52 and the accumulator compression spring 40. The accumulator compression spring 40 exerts a certain preloading, for example $1\times10^5$ Pa, on the lubricant located in the lubricant chamber 4. If a displacement of the lubricant occurs during an opening process due to the stroke of the closing element 3 or also due to thermal expansion or cooling of the lubricant, any overpressure/negative pressure that may be generated in the interior of the lubricant chamber 4 can be compensated for by deflection on the second flexible sealing element 52 in conjunction with a contraction of the accumulator compression spring 40. The flexible sealing element 51 can thus be avoided by an undesired force acting on the closing element 3 via the bellows active surface.

The armature pin 24 with the armature 20 fixed thereto is arranged in the sealed lubricant chamber 4. Because the lubricant chamber 4 is filled with a lubricant, for example a liquid fuel such as gasoline or diesel or a grease or the like, continuous lubrication of the armature 20 is provided. The problem encountered with gaseous fuels in the related art, namely a lack of lubrication of the moving parts, can thereby be overcome.

As can be seen from FIG. 1, a filling channel 17*a* is provided for filling the sealed lubricant chamber 4. The filling channel 17*a* is sealed in a fluid-tight manner by means of a sealing ball 17.

A brake device 6 is also arranged in the sealed lubricant chamber 4. The brake device 6 comprises a brake pin 60, a damping chamber 62 filled with lubricant, and a resilient brake element 61 designed as a brake spring. The damping chamber 62 is fluidically connected to the lubricant chamber 4. Furthermore, the brake device 6 comprises a guide disk 25 in which the armature pin 24 is guided. The guide disk 25 has a plurality of openings 25*a* running in the axial direction. Furthermore, the brake device comprises a brake pin valve 66.

In the open state of the brake pin valve 66, the armature pin 24 is moved together with the closing element 3 in the direction of the arrow B, so that the armature pin is no longer in contact with the brake pin 60.

In the closed state of the brake pin valve 66, a first end face 60*a* of the brake pin 60 facing toward the armature pin 24 is in contact with a second end face 24*a* of the armature pin 24. A through bore 67 which connects the first end face 60*a* to the damping chamber 62 is also formed in the brake pin 60.

Figure 2:
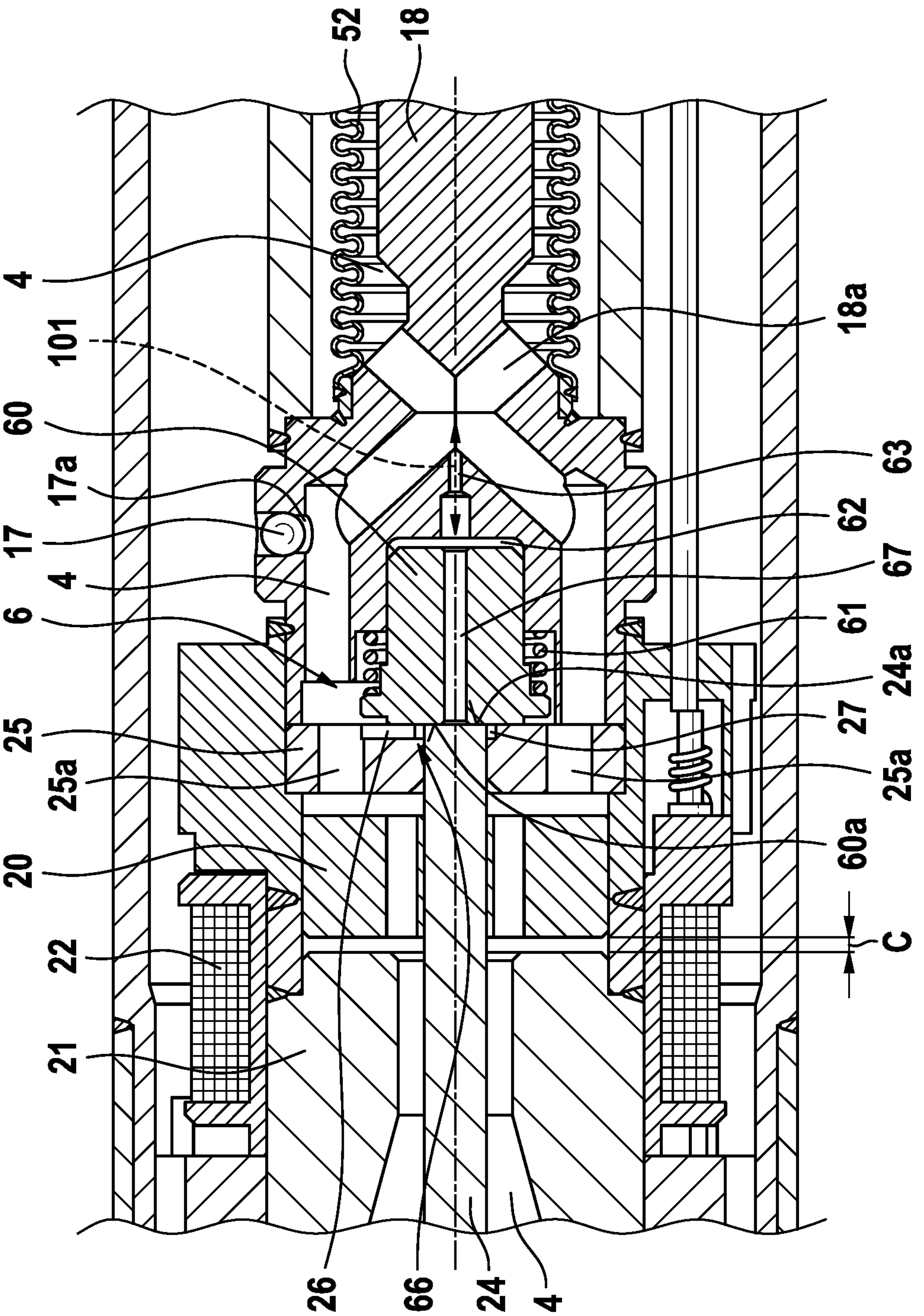
FIG. 2 is a schematic enlarged partial sectional view of the brake device of the gas injector of FIG. 1 in the closed state.

FIG. 2 shows the closed state of the gas injector. As can be seen in the detail of FIG. 2, there is a constant connection between the damping chamber 62 and the lubricant chamber 4 via a throttle 63. This constant connection between the damping chamber 62 and the lubricant chamber 4 forms a first fluid path 101 via which lubricant can flow from the lubricant chamber 4 to the damping chamber 62 and vice versa. As shown in FIG. 2, the first fluid path 101 passes through the guide body 18 in which the throttle 63 is formed. In this case, the throttle 63 opens into the connection bores 18*a* in the guide body 18. The throttle 63 can be designed as a stepped straight bore and is located in the central axis of the gas injector.

Figure 3:
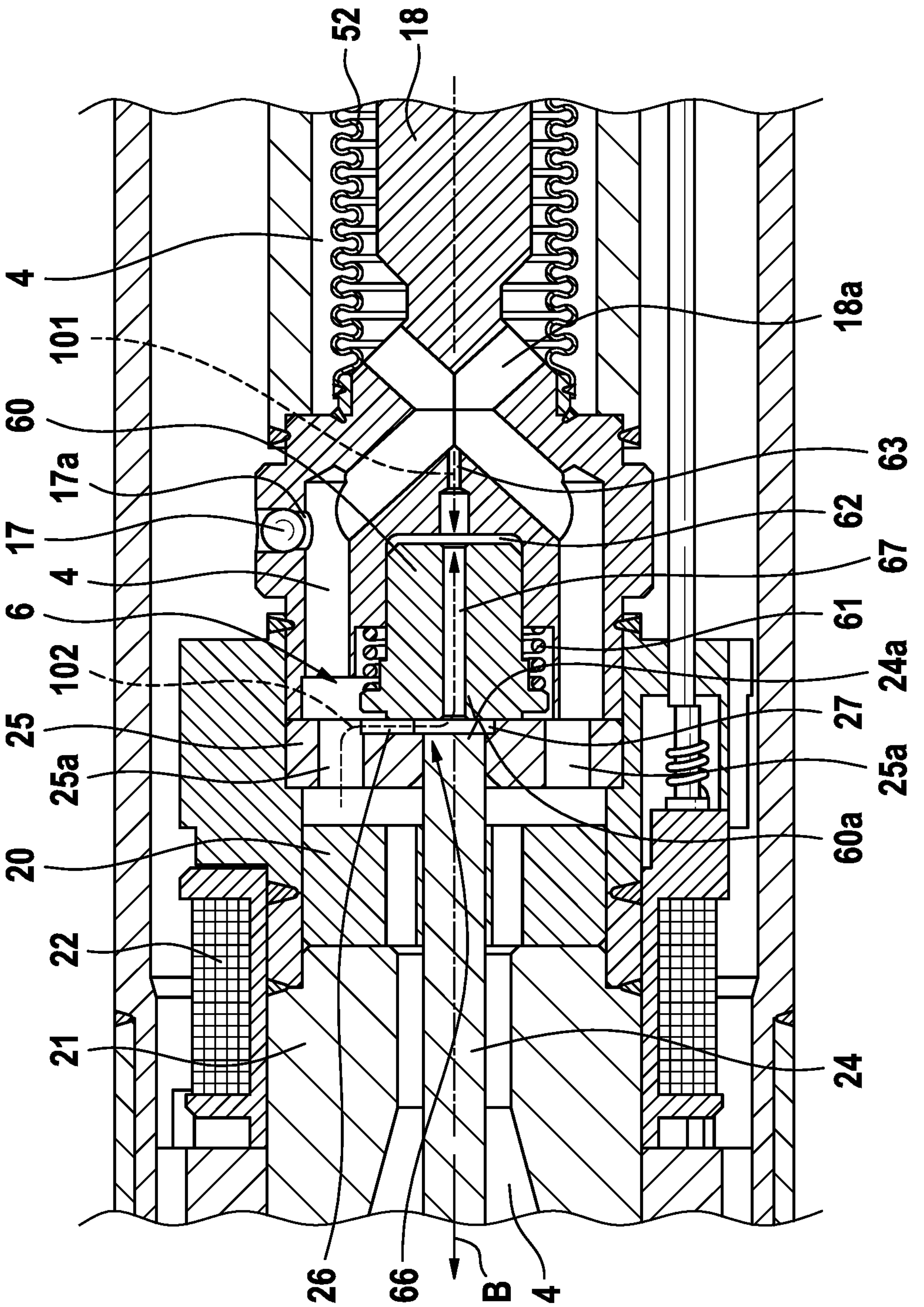
FIG. 3 is a schematic enlarged partial sectional view of the brake device of the gas injector in the open state.

In the open state of the gas injector, as can be seen from FIG. 3, a second fluid path 102 is created via the open brake pin valve 66.

In the open state shown in FIG. 3, the second end face 24*a* at the end of the armature pin 24 is lifted from the first end face 60*a* by the armature travel C. Because a plurality of radially extending channels 26 are provided in the guide disk 25, which channels are formed by the openings in the guide disk 25 into an annular recess 27 on a radial inner side of the guide surface for the armature pin 24, the second fluid path 102 results when the gas injector is open, as indicated by the dashed lines in FIG. 3. In this way, lubricant can flow through the channels 26 and the recess 27 to the through bore 67 and from there to the damping chamber 62. In this case, the damping pin 60 is pressed against the guide disk 25 in the axial direction X-X by the resilient brake element 61.

Two fluid paths 101, 102 are thus provided when the gas injector is open in order to adequately supply the damping chamber 62 with lubricant. This is particularly important because, with very short opening times of the gas injector, rapid resetting of the closing element and thus also of the armature 20 and of the armature pin 24 takes place, which must be damped sufficiently. Such short injection times occur, for example, when the internal combustion engine is idling or in the case of multiple injection.

In this way it is possible to avoid a lack of damping by the brake device 6 despite the short opening time of the gas injector. As is clear from FIG. 3, when the gas injector is opened, the armature pin 24 lifts from its seat surface on the brake pin 60. Immediately after lifting, the brake pin valve 66 is thus opened, so that the lubricant can flow through the channels 26 and the recess 27 as well as the through bore 67 into the damping chamber 62. This flow of the lubricant via the second fluid path 102 is also assisted by the resilient brake element 61, which ensures that the brake pin 60 is pressed against the guide disk 25 in the axial direction and remains in this position. In this case, the brake pin 60 is guided in the guide body 18.

To fill the damping chamber 62, the flow then also occurs via the first fluid path 101 through the always-open throttle 63.

In this exemplary embodiment, a flat sealing seat is formed between the first end face 60*a* of the brake pin 60 and the second end face 24*a* of the armature pin 24. However, it is also possible for a cone/ball seal seat or a cone/cone seal seat to be provided.

The damping process when the gas injector is closed is further assisted by the brake spring 61 and hydraulic adhesion of the brake pin 60 to the guide disk 25. In this case, the damping chamber 62 can prevent cavitation during the closing process of the gas injector in this region between the guide disk 25 and the first end face 60*a* of the brake pin 60.

By selecting a diameter and/or a length of the throttle 63, the damping behavior can additionally be adjusted individually for the corresponding gas injector.

In this case, the gas injector 1 shown in FIG. 1 is balanced as regards pressure force. This means that the closing element 3 is connected to the valve body 9 via the first flexible sealing element 51, wherein the first flexible sealing element 51 in the form of a metal bellows has a mean diameter which is equal to a diameter at the sealing seat 11 at which the closing element 3 seals against the sealing seat 11. This does not result in a pressure force on the closing element 3, so that a magnetic force required to open the closing element 3 can be kept very small and, in particular, is independent of a pressure of the gaseous fuel.

Thus, with the present invention, when the closing element 3 has been set to the open state by actuating the magnetic actuator 2 (moving the closing element 3 to the left in FIG. 1) and gas injection is carried out, reliable damping can be carried out when the closing element 3 is reset, shortly before the closing element is pressed into the sealing seat 11. A closing speed of the closing element 3 is thus significantly and effectively braked before the closing element impacts the sealing seat 11. Wear on the sealing seat 11 and the closing element 3 can thus be effectively reduced, while the brake device 6 continues to allow the gas injector to operate more quietly. A phenomenon known as closing rebound, in which an element hits a sealing seat hard and bounces back, can also be effectively prevented.

The gas injector 1 can thus provide for reduced wear on the moving parts, in particular the sealing seat 11, armature 20 and armature pin 24, and even in the case of smaller strokes can ensure adequate damping by means of the damping chamber 62, which is always sufficiently filled via the two fluid paths 101, 102. Furthermore, heat dissipation from the magnetic actuator 2 can be significantly improved by the sealed lubricant chamber 4 with a liquid lubricant. Furthermore, the two flexible sealing elements 51, 52 can prevent unwanted forces from acting on the closing element 3.

Figure 4:
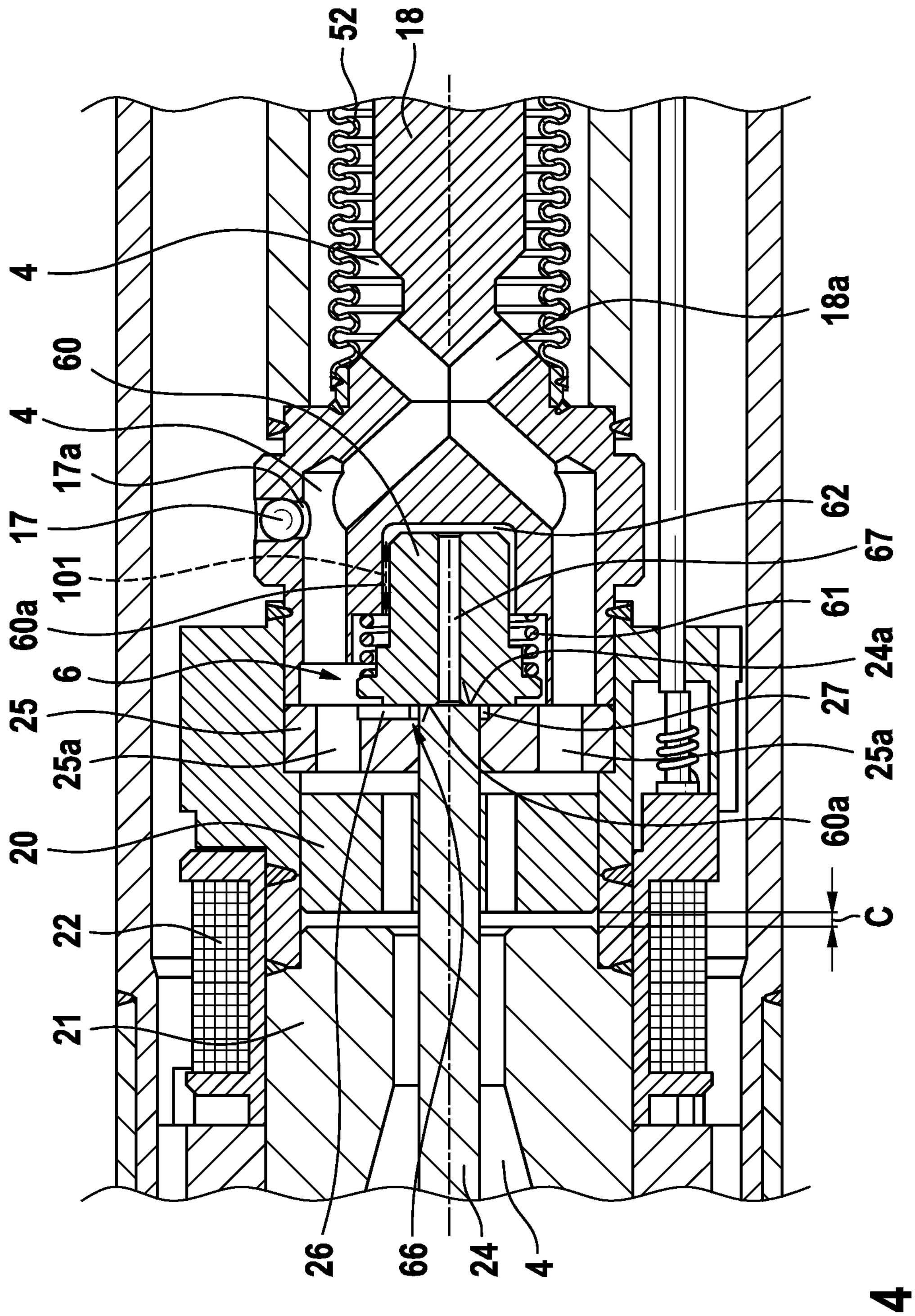
FIG. 4 is a schematic enlarged partial sectional view of a brake device of a gas injector according to a second preferred exemplary embodiment of the present invention.

FIG. 4 is an enlarged partial sectional view of a brake device of a gas injector according to a second preferred exemplary embodiment of the present invention. Identical or functionally identical parts are denoted by the same reference signs as in the first exemplary embodiment.

Like FIG. 2 of the first exemplary embodiment, FIG. 4 shows the closed state of the gas injector. In the second exemplary embodiment, a first fluid path 101 is not designed as a throttle in the guide body 18, but rather the fluid connection between the damping chamber 62 and the lubricant chamber 4 is formed between the brake pin 62 and the cylindrical receiving chamber in the guide body 18 for the brake pin 62. As shown in FIG. 4, one or more grooves 60*a* are formed in the brake pin 60 on the jacket region of the brake pin 60. Alternatively, the first fluid path 101 can also be set by the play between the brake pin 60 and the cylindrical region of the guide body 18 in which the brake pin 60 is received. Alternatively or additionally, one or more grooves can also be provided in the cylindrical region of the guide body 18. Throttling in the first fluid path thus takes place in the region between the brake pin 60 and the cylinder-like partial region of the guide body 18. Otherwise, this exemplary embodiment corresponds to the preceding exemplary embodiment, and so reference may be made to the description given therein.

The invention claimed is:

1. A gas injector for injecting a gaseous fuel, comprising:

a magnetic actuator having an armature, an inner pole, and a coil;

a closing element which opens and closes off a gas path at a sealing seat, wherein the armature is operatively connected to the closing element;

a sealed lubricant chamber which is filled with a lubricant and in which the armature is arranged, wherein the lubricant ensures lubrication of the armature; and a brake device which is arranged in the lubricant chamber and is configured to brake the closing element when the gas injector is reset from an open state to a closed state;

wherein the brake device has a brake pin, a damping chamber which is filled with lubricant and is fluidically connected to the lubricant chamber via a first fluid path, a resilient brake element, an armature pin which is operatively connected to the armature and includes a guide disk, wherein the brake pin and the resilient brake element can be operatively connected to the closing element during a resetting process, and the brake pin is configured to displace lubricant out of the damping chamber and into the lubricant chamber during the resetting process of the gas injector in order to damp the resetting process of the closing element to the closed state, and wherein the armature pin is guided in the guide disk and a brake pin valve is provided for opening and closing off a second fluid path on a brake valve seat between the lubricant chamber and the damping chamber, wherein the brake pin valve is configured to fill the damping chamber with lubricant when the gas injector is in an open state.

2. The gas injector according to claim 1, wherein a through bore is formed in the brake pin, which connects a first end face of the brake pin to the damping chamber, wherein the armature pin has a second end face, wherein, in the closed state of the gas injector, the first end face of the brake pin rests against the second end face of the armature pin in such a way that the second fluid path is closed so that no lubricant can flow into the damping chamber via the through bore.

3. The gas injector according to claim 1, wherein the brake device further includes a throttle which is arranged in the first fluid path between the damping chamber and the lubricant chamber.

4. The gas injector according to claim 3, wherein the throttle is configured to be open in each operating state of the gas injector and is configured as a stepped bore.

5. The gas injector according to claim 1, wherein: (i) one or more channels are formed in a side of the guide disk directed toward the brake pin, and/or (ii) one or more channels are formed in a first end face of the brake pin.

6. The gas injector according to claim 5, wherein the one or more channels are fluidically connected to one another by a peripheral recess.

7. The gas injector according to claim 6, wherein the peripheral recess is formed in the guide disk.

8. The gas injector according to claim 1, wherein the brake valve seat of the brake pin valve is a flat sealing seat or a cone/ball seat or a cone/cone seat.

9. The gas injector according to claim 1, wherein the resilient brake element is arranged in the damping chamber.

10. The gas injector according to claim 1, further comprising a guide body arranged in the lubricant chamber and configured to guide the brake pin.

* * * * *